(12) United States Patent
Tieben

(10) Patent No.: US 12,042,973 B2
(45) Date of Patent: *Jul. 23, 2024

(54) SEALING DEVICE WITH COOLING FUNCTION

(71) Applicant: KRAUSSMAFFEI EXTRUSION GMBH, Hannover (DE)

(72) Inventor: Michael Tieben, Hannover (DE)

(73) Assignee: KRAUSSMAFFEI EXTRUSION GMBH, Hannover (DE)

( * ) Notice: Subject to any disclaimer, the term of this patent is extended or adjusted under 35 U.S.C. 154(b) by 328 days.

This patent is subject to a terminal disclaimer.

(21) Appl. No.: 17/636,085

(22) PCT Filed: Aug. 25, 2020

(86) PCT No.: PCT/EP2020/073718
§ 371 (c)(1),
(2) Date: Feb. 17, 2022

(87) PCT Pub. No.: WO2021/043630
PCT Pub. Date: Mar. 11, 2021

(65) Prior Publication Data
US 2022/0288831 A1  Sep. 15, 2022

(30) Foreign Application Priority Data

Sep. 4, 2019 (DE) ...................... 10 2019 123 608.8

(51) Int. Cl.
*B29C 48/25* (2019.01)
*B29C 48/40* (2019.01)
(Continued)

(52) U.S. Cl.
CPC .......... *B29C 48/254* (2019.02); *B29C 48/402* (2019.02); *B29C 48/85* (2019.02); *B33Y 80/00* (2014.12); *F16J 15/182* (2013.01)

(58) Field of Classification Search
CPC ........ F16J 15/182; B29C 48/254; B29C 48/85
See application file for complete search history.

(56) References Cited

U.S. PATENT DOCUMENTS 5,106,286 A * 4/1992 Klein .................... B29C 48/254
425/207
5,873,575 A * 2/1999 Hanlon .................. F16J 15/162
277/517

(Continued)

FOREIGN PATENT DOCUMENTS

DE 102011016817 A1 10/2012
DE 102017216463 A1 3/2019
(Continued)

*Primary Examiner* — Vishal A Patel
(74) *Attorney, Agent, or Firm* — Pearne & Gordon LLP

(57) ABSTRACT

A sealing device for sealing the intermediate space between a housing and a shaft rotatably mounted in the housing, having a first plate-shaped body with a front face, a rear face, and a first opening, which extends from the front face to the rear face and is suitable for feeding through the shaft, and having a cooling line, which runs in the body and is suitable for conducting a cooling medium. The first body is suitable for being tightly secured to the housing such that the shaft rotatably mounted in the housing is guided through the first opening. The first opening is suitable for introducing sealant such that the sealant seals an intermediate space between the shaft and the first body. The cooling line is guided around the first opening between a cooling line inlet and a cooling line outlet for the cooling medium such that heat produced from rotating the shaft can be dissipated by the cooling medium in a spatially homogenous manner.

11 Claims, 3 Drawing Sheets

(51) Int. Cl.
*B29C 48/85* (2019.01)
*B33Y 80/00* (2015.01)
*F16J 15/18* (2006.01)

(56) References Cited

U.S. PATENT DOCUMENTS

| | | | | |
|---|---|---|---|---|
| 6,932,351 | B1* | 8/2005 | Mowll | F04B 39/0022 |
| | | | | 277/517 |
| 8,366,114 | B1* | 2/2013 | Gruner | F28F 9/00 |
| | | | | 277/510 |
| 2008/0018055 | A1* | 1/2008 | Moldt | B29C 48/254 |
| | | | | 277/500 |
| 2010/0059938 | A1* | 3/2010 | Hilton | F16F 15/30 |
| | | | | 277/309 |

FOREIGN PATENT DOCUMENTS

| | | |
|---|---|---|
| EP | 2842716 A1 | 3/2015 |
| JP | S5513072 U | 1/1980 |

* cited by examiner

SEALING DEVICE WITH COOLING FUNCTION

CROSS-REFERENCE TO RELATED APPLICATIONS

This is a National Stage application of PCT international application PCT/EP2020/073718 filed on Aug. 25, 2020, which claims the priority of German Patent Application No. 10 2019 123 608.8, filed Sep. 4, 2019, which are incorporated herein by reference in their entireties.

FIELD OF THE INVENTION

The present invention relates to a sealing device for sealing rotatably mounted shafts and for dissipating heat which is formed by friction. In addition, the present invention relates to a method for producing such sealing devices.

BACKGROUND OF THE INVENTION

In a variety of machines, shafts are used for the transmission of rotary movements. In particular, it is known to use drive shafts for the rotating of mixing devices. For this, the drive shafts are directed out from a gearing and/or motor into a housing, in which they are connected to the mixing devices in order to move these. An example for such machines are extrusion systems in which extruder screws, rotating in a housing, thoroughly work or respectively mix an extrusion mass. Such extruder screws are connected to a drive shaft which projects out from the housing of the extrusion system.

EP 2 842 716 A1 relates to a screw machine for the processing of plastic melts. JP S55 13072 U concerns a sealing device for a screw bearing section of an extrusion moulding machine.

In such mixing devices, an intensive dust generation can occur, owing to the mixing process (e.g. owing to abrasion) or owing to the materials which are used for the mixing (e.g. materials or mixing additives in powder form, such as for instance chalk, talcum or colour powder). Without a sealing of the intermediate space between the housing of the mixing device and the shaft projecting out from the housing, an intensive contamination would occur during operation. In addition, exiting dusts can be hazardous to health or can also lead to a damage of the motor, of the gearing or respectively of the drive train, owing to excessive dust deposition.

Devices which are used for such sealing can consist of at least one housing element and a sealant lying therein, such as for instance a press seal, an O-ring, a radial shaft sealing ring, a stuffing box or suchlike. It is advantageous here to equip the housing element additionally with a cooling line, in order to direct frictional heat, occurring between shaft and sealant or respectively housing element, out from the sealing assembly. The cooling lines are to run here as close as possible to the friction points at which the heat development takes place, in order to maximize the cooling effect.

Usually, the lines are drilled in for this, and the open ends are closed again by stoppers, wherein only one inlet opening and one outlet opening remain open. In so doing, however, the following problems can arise.

On the one hand, through the machining manufacturing process, the cooling lines are limited geometrically and in most cases do not provide for a homogeneous, i.e. spatially uniform heat dissipation. This can lead to a nonuniform heating of the sealing and/or to an overheating of the sealant and hence to a damage to the sealing.

In addition, the production process with several processing steps is laborious. The housing elements also have possibly relatively large or several sealing areas, whereby a leakage of the cooling can occur. Thereby, an excessive consumption of coolant and/or a contamination of the system can occur.

With a limited installation space or poor accessibility to the housing element of the sealing, it is often only possible to introduce a simply configured cooling line into the housing element, which does not reach all the regions which are to be cooled. Hereby, also, a damage to the sealing can occur owing to overheating.

Moreover, shavings occurring during the production with machining processes can remain behind in the cooling lines, which impede the throughflow of the cooling medium. This leads to an impaired cooling performance and can reduce the lifespan of the sealant which is used.

BRIEF SUMMARY OF THE INVENTION

The object of the present invention is to create a sealing device for rotatably mounted shafts, with which the above-mentioned problems do not occur. In particular, a sealing device is to be created which guarantees a spatially homogeneous removal of frictional heat occurring in the sealing device.

This problem is solved by the subject of the independent claims. Advantageous further developments are defined in the dependent claims.

A sealing device for sealing the intermediate space between a housing and a shaft, rotatably mounted in the housing, can have a first plate-shaped body with a front face, a rear face and a first opening, which extends from the front face to the rear face and is suitable for feeding through the shaft, and a cooling line running in the body, which is suitable for conducting a cooling medium. Here, the first body is suitable for being tightly secured to the housing such that the shaft, rotatably mounted in the housing, is guided through the first opening. The first opening is suitable for introducing sealants such that the sealants seal an intermediate space between the shaft and the first body. The cooling line is guided around the first opening between a cooling line inlet and a cooling line outlet for the cooling medium such that heat produced by rotating the shaft can be dissipated by the cooling medium in a spatially homogeneous manner.

Both an opening, receiving the sealant, for the shaft, and also the cooling line are therefore situated in the same structural element of the sealing device. Through its plate-shaped configuration, this sealing plate or respectively this first body is suitable for being tightly secured to the housing, such that a material situated in the housing can exit from the housing along the shaft only via the opening of the first body.

At the same time, owing to the sealant placed in the opening, friction takes place only in the region of the opening of the sealing device. Owing to this localisation, it is possible to guide the cooling line along sufficiently closely to the site of the friction, i.e. sufficiently close to the opening. The distance of the cooling line from the opening can lie here in the range of 0.5 cm to 10 cm, e.g. at 1 cm, 2 cm, 5 cm or 7 cm. The distance can vary here in the course of the cooling line. However, the distance can also be constant.

The cooling line can run e.g. continuously around the opening. Hereby, an optimum removal of heat can take place, in particular when the first body consists of a material with high thermal conductivity, for instance a metal, such as e.g. aluminium, iron or copper. In particular, the removal of heat is spatially homogeneous owing to the continuous course of the cooling line, i.e. the heat occurring through the friction at the sealant which is inserted in the opening is dissipated uniformly in all directions, starting from the edge of the opening.

Thereby, a non-uniform heating and/or overheating of the sealing device or respectively of the sealant inserted into it, or of the shaft, is counteracted, whereby a premature ageing or respectively a damage to the sealant can be prevented.

The first body can be formed in one piece, in particular by means of an additive manufacturing method. The first body then therefore does not consist of several subcomponents, such as for instance of the combination of a plate with a milled-in cooling line which is covered by a further plate, but rather only of one single element.

In the case of an additive manufacture, e.g. by means of 3D printing, the first body is built up layer by layer. Cavities provided in the first body, such as the cooling line or the first opening, are already left free here during the manufacture. This makes a later machining processing unnecessary. There is therefore no risk of shavings blocking the cooling line.

The production by means of additive manufacturing methods has, in addition, the advantage that the form and position of all the cavities, therefore in particular of the cooling lines and of the opening are entirely freely selectable, both with regard to the course and also the cross-section. In particular, the cooling lines can have any desired cross-section, e.g. round, oval or angular. The cross-section area can also change within the cooling line. Likewise, it is possible to realize any desired, advantageous line directing, therefore in particular to carry out any number of diversions and/or branches or respectively divergences. Hereby, the pressure drop within the line can be set optimally, which leads to a smaller consumption of cooling medium, a quicker or better directed heat dissipation and/or a saving on energy.

The first body can be produced from any material which has a sufficient strength for use as a sealing plate. Preferably, the first body is made from metal, e.g. from aluminium.

It is particularly advantageous here if the cooling line has a hexagonal cross-section. This namely allows the manufacture of the sealing device to be simplified by means of additive methods. Owing to the hexagonal shape of the line cross-section, e.g. as an equiangular or elongated hexagon, namely in the layered construction of the first body, overhangs do not occur, which are too unstable with respect to the weight of the next layer, in order to prevent a collapsing of the cooling line duct.

In particular, it is advantageous here to choose a line cross-section in which tips of the hexagon point in the direction of the front face and of the rear face of the first body. Then, namely in the construction of the first body, firstly a v-shaped notch can be left free, to which walls, perpendicular hereto, adjoin, the length of which is greater than the length of the sides of the notch. These can be covered, for closing the cooling line, with a closure in the form of an upwardly pointing wedge (/\), which can correspond to the mirrored v-shaped notch, as this shape is sufficiently stable for a layer sequence growing together.

In addition, the hexagonal shape can be symmetrical with respect to turns through 180° or mirrorings. The first body can then be manufactured starting from its front face or from its rear face. This makes the production more flexible and hence easier.

The cooling line can diverge within the first body into several partial lines. Thereby, a better dissipation of the produced frictional heat can be guaranteed.

The sealants are configured as a stuffing box. This is a sealing for rotatable shafts which is easy to realize. In addition, a stuffing box permits a readjusting of the seal in the case of incipient leakage, e.g. due to abrasion. The sealants can thus remain in operation as long as possible, without having to be exchanged.

Furthermore, the sealing device can have a sealing line running in the body which is suitable for directing a liquid or gaseous sealing medium. The sealing line has here a multiplicity of outlets, connected with an inlet via at least one diversion and/or at least one divergence, which lead radially symmetrically into the first opening. The sealants which are introduced into the first opening seal here an intermediate space between the shaft and the first body, without blocking the outlets of the sealing line.

In this case, the sealing device is suitable for sealing by means of a combination of sealants and a sealing medium. Hereby, the sealing characteristics of the sealing device are improved. Through the radially symmetrical feeding in of the sealing medium, it is guaranteed in particular that the shaft, situated in the opening, is entirely surrounded by the sealing medium in order to guarantee a reliable seal.

The first body can have a further opening which is suitable for the feeding through of a further shaft. This allows the sealing device to also be used for devices which have several, in particular parallel, shafts. In particular, such a sealing device is suitable for a use in multi-shaft extruders.

Furthermore, the sealing device can have a further body which is constructed like the first body and is suitable for being tightly connected to the first body such that the first opening of the first body overlaps with the further opening of the further body and permits the feeding through of the shaft, and that the further opening of the first body overlaps with the first opening of the further body and permits a feeding through of the further shaft. The cooling line of the first body can be connected here to a cooling line of the further body such that both cooling lines are fed via a shared inlet.

The first and third body are therefore substantially identical in construction, i.e. they have the same types of openings and lines. Both bodies have a first opening, into which a sealant can be inserted and which therefore must be cooled during a sealing operation, and a further opening. In both bodies, a cooling line runs around the first opening, in order to be able to dissipate the frictional heat occurring during operation.

A shaft can be directed through both openings. However, the openings with the sealants do not lie over one another, but rather are respectively assigned to another shaft. Hereby, a sealing can be realized for two shafts which are running parallel, as are present e.g. in twin-screw extruders.

An inlet of the cooling line of a body can be connected to the outlet of the cooling line of the other body, so that a closed cooling circuit is produced. This makes it possible to seal in an efficient manner systems with two rotatable shafts.

Likewise, it is conceivable to provide several openings in a sealing plate, which are surrounded by cooling lines as were described above. Hereby, also, multi-shaft systems with any desired number of shafts can be effectively sealed. In addition, several sealing plates, as were described above, can be used, fastened on one another, with corresponding supplementation of through-openings, for the sealing of systems with any desired number of shafts.

An extrusion device can have an extrusion screw rotatably mounted in a housing by means of a shaft, and a sealing device for sealing the intermediate space between the housing and the shaft, as was described above. Such an extrusion device is therefore effectively sealed with respect to the exiting of extrudate and/or of, in particular pulverulent, mixing additives in the direction of the screw drive. At the same time, the sealing device is cooled, whereby the lifespan of the sealant which is used increases.

A multi-screw extrusion device can have two extrusion screws rotatably mounted in a housing by means of a first shaft and a second shaft, and a sealing device for several shafts, as was described above. Hereby, multi-screw extruders can be sealed in an effective manner with respect to the exiting of extrudate and/or of, in particular pulverulent, mixing additives in the direction of the screw drive. At the same time, the sealing device is cooled, whereby the lifespan of the sealants which are used increases.

A method for the production of a sealing device as was described above can comprise: producing the first body by means of an additive production method, in particular by means of 3D printing. As described above, this allows the sealing device to be produced in a manner which is as efficient and as fit for purpose as possible.

A computer program product, with execution on a device for additive manufacture, can cause the device for additive manufacture to carry out the above method.

BRIEF DESCRIPTION OF THE DRAWINGS

The invention is to be explained below in detail with reference to the enclosed figures. It is self-evident that this description is only by way of example. The subject of the invention is defined solely by the claims. There are shown:

DESCRIPTION OF EXAMPLE EMBODIMENTS

The present invention is explained below with reference to a sealing device 100 for a twin-screw extruder. However, the invention is not to be limited hereby. In particular, the generalization of the following description to sealing devices for extruders with only one or more than two screws and also the generalization to sealing devices for other machines which have one or more shafts which are to be sealed with respect to a housing, is to be included by the invention, in so far as it falls within the subject of the claims.

Figure 1:
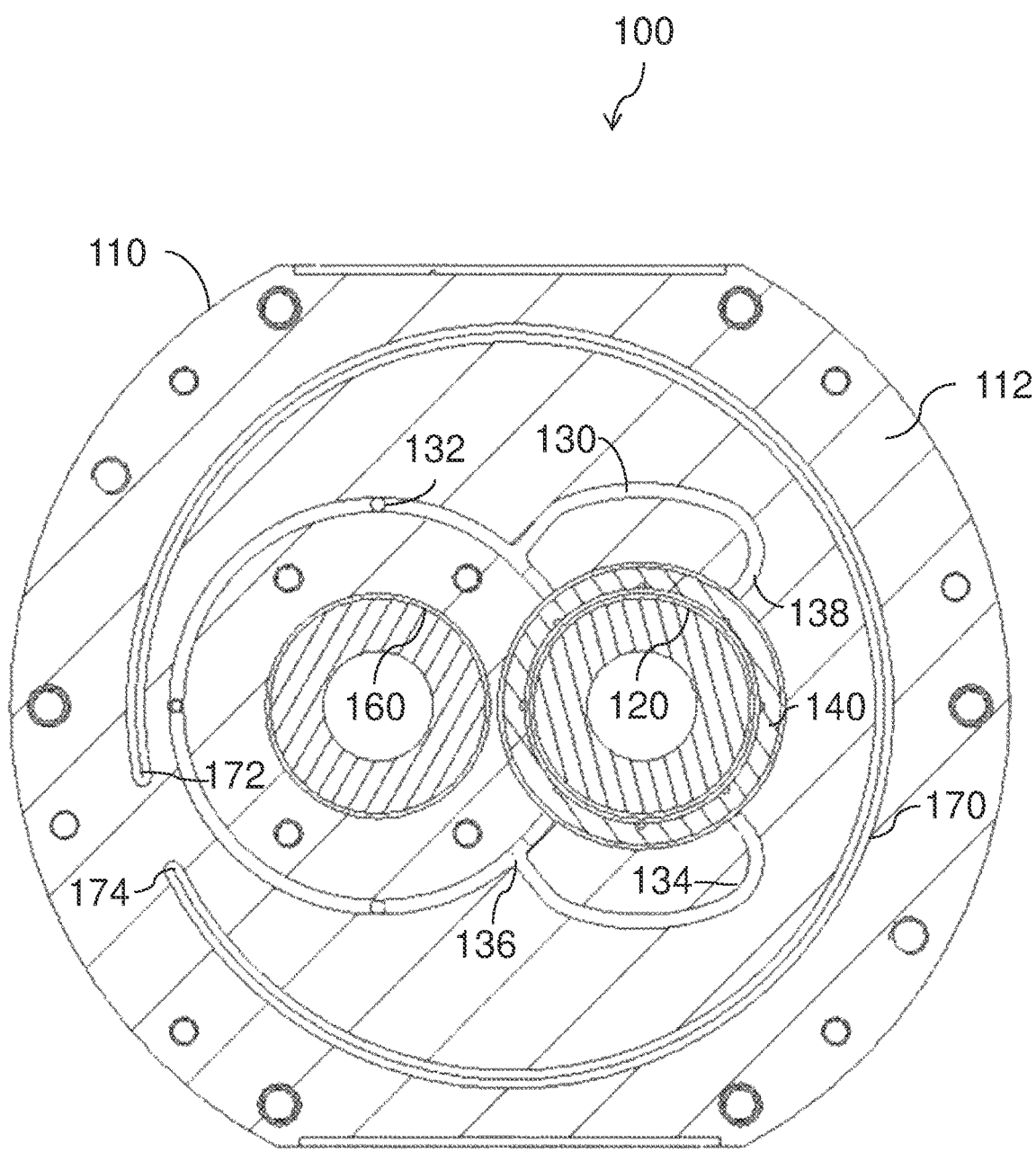
FIG. 1 a schematic view of a sealing device.

FIG. 1 shows a schematic view of the sealing device 100 for sealing an intermediate space between a housing and a shaft which is rotatably mounted in the housing.

The sealing device 100 has a plate-shaped first body 110. The sealing device 100 can consist substantially of the first body 110. However, as explained below by way of example with reference to FIGS. 2A and 2B, it can also be composed of several components.

The first body 110 is configured as a cover plate, i.e. its extent in two directions is greater than its extent in the third direction. The first body 220 is configured here such that it can be mounted in a secure and flush manner on a surface of the housing which is to be sealed, e.g. by screw connections, rivets, welding or suchlike. The surface of the first body 110 which comes in contact with the housing can be configured here in any desired manner, as long as it is guaranteed that the contact between housing and first body 110 is tight such that materials exiting from the housing can not escape along the connection between housing and first body 110. In this way, it is achieved that the desired sealing between housing and shaft can also be produced between the first body 110 and the shaft.

The sealing between housing and first body 110 can take place here in any desired manner, e.g. by pure press connection of components, lying against one another, by means of screwing, riveting or suchlike, by additional sealants, such as for instance rubber sealing elements, or sealing media, such as grease for instance, or else by a welding of first body 110 and housing.

As is explained with reference to FIG. 2, further components can also be arranged between the housing and the first body 110, as long as the connection of the housing to the first body 110 (including the further components) is tight as a whole.

The first body 110 can consist here of any sufficiently strong material which is suitable for being configured in the form described further below, and which can be connected to the housing. In particular, the first body 110 can consist of a metal such as for instance aluminium or iron. The first body 110 can, however, also be made from a sufficiently hard plastic or from ceramic.

In the first body 110 a (first) opening 120 is provided, which extends between a rear face and a front face of the first body 110. The first opening 120 is sufficiently large that the shaft projecting from the housing can be directed through it when the sealing device 100 or respectively the first body 110 are connected to the housing. For example, the opening 120 can have a diameter of 10 cm to 100 cm or more, for instance 20, 40, 60 or 80 cm. The first opening 120 therefore allows the shaft to rotate when the sealing device 100 and the housing are connected to one another.

Through the secure and tight connection of housing and first body 110, a region from which the material which is to be sealed, situated in the housing, (e.g. a powder such as chalk, talcum or a colour powder) can exit, shifts to the intermediate space between first body 110 and the shaft. Therefore, for sealing, it is sufficient to seal the region of the opening 120 which is not filled by the shaft.

The opening 120 is therefore configured such that a (first) sealant 140 can be inserted therein, which completely seals the opening 120 in the region between first body 110 and the shaft. The sealant 140 can adopt any desired shape here which is suitable for the sealing of the intermediate space between the first body 110 and the rotating shaft. For example, the sealant 140 can be an O-ring, a radial shaft sealing ring or suchlike, or else a combination thereof. Preferably, the sealant 140 is configured as a stuffing box, as this permits a readjusting in the case of leakage. The sealant 140 typically consists of rubber, caoutchouc or suchlike. The opening 120 can then be configured e.g. in a graduated manner, in order to enable a pressing in, and hence spreading apart of the sealant 140 against the gradation, whereby the sealant 140 is pressed against the rotatable shaft and thus improves the sealing.

As the sealant 140 must lie closely against the shaft and the first body, for an effective sealing, friction occurs between the shaft, the sealant 140 and/or the first body 110, and hence a heat development. Likewise, with corresponding configuration of the first body 110, friction, and hence heat development, can also occur between the shaft and the first body 110. This frictional heat can become considerable in the case of a longer operation of the shaft and, without cooling, can cause a damage to the sealant 140, to the shaft and/or to the sealing device 100.

For this reason, the first body 110 has a cooling line 170, which runs from a cooling line inlet 172 to a cooling line outlet 174 and which is suitable for directing a cooling medium, such as for instance air, water or another known cooling fluid. The cooling line 170 surrounds here in particular the first opening 120 with the sealant 140 inserted therein. For this, the cooling line 170 has a continuous diversion and/or several branches, through which the cooling line 170 always runs close to all sites at which frictional heat can be generated. The cooling line 170 is therefore able to dissipate the produced frictional heat in a spatially homogeneous manner.

The cooling line 170 can run here in a circular manner, as shown in FIG. 1, and can form a circle which is closed except for a few centimetres. The cooling line 170 therefore cools here the entire circumference of the first body 110. Heat which is transported from the opening 120 through the first body 110 can be dissipated uniformly hereby in a particularly effective manner.

Generally, however, the cooling line 170 can have any desired line guiding, which makes it possible to dissipate the generated frictional heat uniformly out form the first body 110. For example, the cooling line 170 could also have a star-shaped course with several branches. In addition, several cooling circuits can also be formed in the first body 110, when this is considered to be advantageous.

As shown in FIG. 1, the cooling line inlet 172 and the cooling line outlet 174 can be situated respectively on the front face or rear face of the first body 110. Hereby, a modular connection with cooling lines present in further components of the sealing device is made possible, as is described e.g. further below with reference to FIGS. 2A and 2B. In addition, this arrangement allows the cooling line 170 to be directed entirely within the first body 110 and hence adjacent to frictional heat which is being produced, whereby the cooling performance is improved. The cooling line inlets and outlets 172, 174 can, however, also be arranged on the side of the first body 110. In addition, a multiplicity of cooling line inlets 172 and/or cooling line outlets 174 can also be present, if this is necessary.

A cross-section of the cooling line 170 can be shaped here in any desired manner, e.g. round, oval or angular. The cross-section geometry and the width of the cooling line 170 can also change in their course, if this were to be necessary. As described further below, a hexagonal shape with tips pointing to the front face and rear face is particularly advantageous for a first body 110 produced by means of 3D printing. The diameter of the cooling line 170 typically lies in the range of 0.5 cm to 3 cm.

As shown in FIG. 1, the first body 110 can have as an optional component a sealing line 130 or respectively a line system formed by the sealing line 130, in which a sealing medium can be directed to the opening 120, in particular a gaseous or liquid sealing medium, such as for instance air, water or grease. The sealing line 130 can have here any desired cross-section suitable for the directing of the desired sealing medium, which can also change in its shape and its area. The diameter of the sealing line 130 can lie in the range of 1 mm to 20 mm and be, e.g. 2 mm, 5 mm, 10 mm or 20 mm.

The sealing line 130 has one or more inlets 132, via which the sealing medium can be introduced into the sealing line 130. In FIG. 1 three such inlets 132 are shown. It is self-evident, however, that any desired expedient number can be used, in particular also only one inlet 132. The inlets 132 can be situated both on the front face and also on the rear face of the first body 110. The feeding of the sealing medium can therefore take place from the exterior, i.e. via the side of the first body 110 facing away from the housing. However, it can also take place via lines arranged in the housing or in intermediate components. The inlets 132 are then situated in the side of the first body 110 facing the housing. The inlets or respectively the inlet 132 can, however, also be situated on the side of the first body 110.

The sealing line 130 extends from the inlets 132 via diversions 134 and divergences or respectively branches 136 to outlets 138, via which the sealing medium can be brought to the shaft which is directed through the opening 120. The diversions 134 and divergences 136 serve to surround the shaft as radially symmetrically as possible with the sealing medium. The sealing line 130 is therefore shaped such that the outlets 138 are arranged radially symmetrically to the shaft axis. Thus, in FIG. 1 the four outlets 138 are respectively offset by 90° degrees to one another. The number of outlets 138 can be as desired. Preferably, it is greater than one, in order to guarantee a uniform feeding of sealing medium. However, a sealing device 100 with only one outlet 138 is also conceivable.

The sealing line 130 can lie here in the same plane as the cooling line 170. The two line systems can, however, also be arranged in different planes, i.e. spaced differently from the front face or respectively rear face of the first body 110.

The combination, described above, of first opening 120 and cooling line 170 in a plate-shaped first body 110 constitutes (if applicable with the sealing line 130) the fundamental principle of the sealing device 100. Hereby, a cooled sealing of a shaft, rotating in a housing, can be achieved in a simple manner. Even if this is not shown below in the figures, this combination can be used alone for an individual shaft. Likewise, it would be possible to accommodate several such combinations in a single sealing plate, in order to seal several shafts in a cooled manner.

Alternatively, as explained below with reference to FIGS. 2A and 2B, several sealing plates, which are shaped according to the first body 110, can be mounted over one another (or behind one another), in order to seal several shafts in a cooled manner.

For this purpose, as shown in FIG. 1, a further opening 160 can be provided, through which a further shaft can be directed. This further opening 160 is also surrounded in FIG. 1 by the cooling line 170, in order to be able to potentially dissipate heat directed along the further opening 160. However, it is also possible to leave open the further opening 160, i.e. to direct the cooling line 170 only around the first opening 120 with the sealant 140.

As shown in FIG. 1, the further opening 160 is not provided with outlets 138 of the optional sealing line 130, i.e. no sealing medium can be introduced into the further opening 160 from the sealing line 130 which is provided in the first body 110.

The first body 110 can be configured in one piece, as shown in the figures, i.e. the first body 110 is not formed from different components. In particular, the first body 110 can be produced in an additive manufacturing method, such as 3D printing. This has the advantage that all the cavities running in the first body 110, such as the cooling line 170, the openings 120, 160 or the sealing line 130 can have a far more flexible and almost any desired shape. In addition, through the dispensing with machining manufacturing techniques, such as drilling or milling, it is prevented that shavings block the cooling line 170 (or the sealing line 130) entirely or partially. Preferably, the first body 110 then consists of a metal, for instance aluminium.

It is particularly advantageous here to manufacture the cooling lines 170 (or also the sealing lines 130) with a hexagonal cross-section, in which the six corners of the hexagon are aligned such that two opposite tips point to the front face and the rear face of the first body 110. Preferably, the hexagon is configured here such that sides standing parallel to the shaft axis are formed longer than the sides which form the tips pointing to the front face and the rear face of the first body 110.

Through such a configuration of the cooling lines 170, it can be ensured that the cooling line passages in the layered construction of the first body do not collapse because overhangs of material which are too large occur. In addition, in the case of invariance with mirroring, it can be guaranteed that the first body 110 can be printed both from its rear face and also from its front face.

Alternatively, it is also possible to compose the first body 110 from several components, as long as the cooling lines 170 are arranged in a component which is produced by means of additive manufacture. With regard to the sealing line 130, however, processing can also be carried out by machining methods, e.g. by milling on the surface of a component, which is then covered by another component.

Furthermore, it is optionally possible, for improving the sealing of the first opening, to arrange a further (second) sealant in the opening 120 (without covering the outlets 138). Thus, inter alia, an exiting of the sealing medium from the opening 120 is prevented. The opening 120 can, however, also be sealed in a different manner against such an exiting, e.g. by sealants applied in a flat manner on the first body 110, through which the shaft projects, or by a sealant which is held in its position by a further component or sealing plate.

The sealant 140 can be arranged with respect to the outlets 138 preferably on the side of the sealing device 100 facing the housing. It therefore serves as first sealing for material exiting from the housing.

With a running shaft, it can always occur that the shaft shifts perpendicularly to the rotation axis. This leads to a squeezing of the sealant 140, whereby a small leaky region can arise between sealant 140 and shaft or between sealant 140 and first body 110. The material to be sealed, which is situated in the housing, can exit through this region. However, it is then caught by the sealing medium in the opening 120.

In addition, with the provision of a further sealant on the other side of the outlets 138, the sealing medium can be introduced under pressure in the intermediate space between the sealants. The exiting of a leaky region at one of the sealants then leads to the sealant flowing into the region and hence preventing the material, which is to be sealed, from exiting.

Pressure sensors connected to the sealing line 130 can establish the pressure drop which is connected therewith. This makes it possible to monitor the tightness of the sealing, in order to promptly initiate a repair or a replacement of the sealing device 100.

The sealant 140 can, however, also be able to be inserted into the opening 120 on the side of the sealing device 100 facing away from the housing, and be held there e.g. by a gradation. In this case, also, through the combination of sealing medium and sealant 140, an improved sealing is achieved. The sealing medium is then held in the opening by a further sealant, e.g. lying on the first body 110, which is arranged between the first body 110 and the housing.

With the sealing device 100 shown in FIG. 1 it is therefore possible to solve the above-mentioned problems. A rotating shaft can be sealed in a reliable manner. The seal can be cooled by means of the cooling line 170 arranged in a sealing plate. Hereby, premature wear and damage to the seal are prevented. Thereby, a durable and reliable sealing is achieved.

Figure 2A:
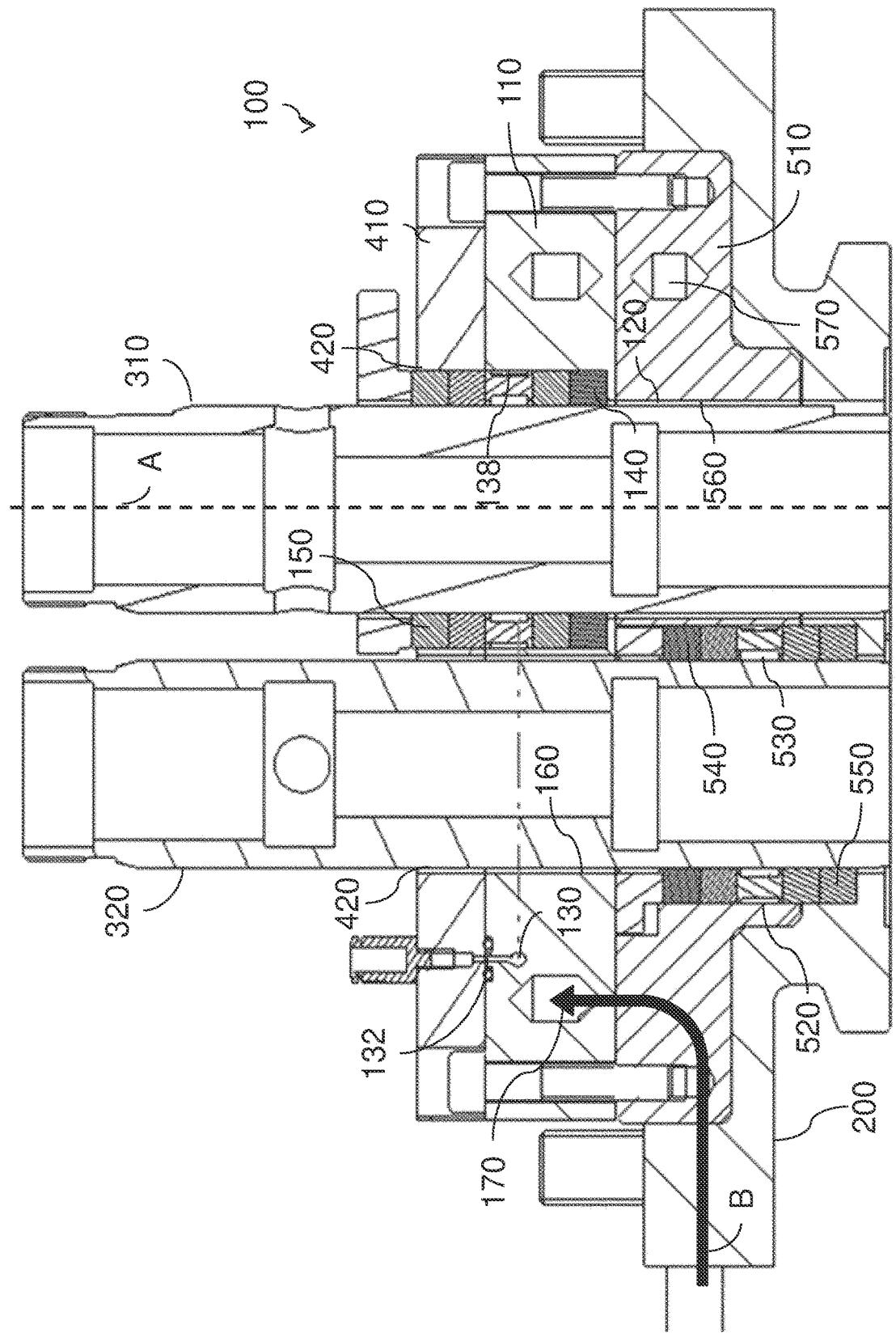
FIGS. 2A and 2B a schematic view of a further sealing device.
Figure 2B:
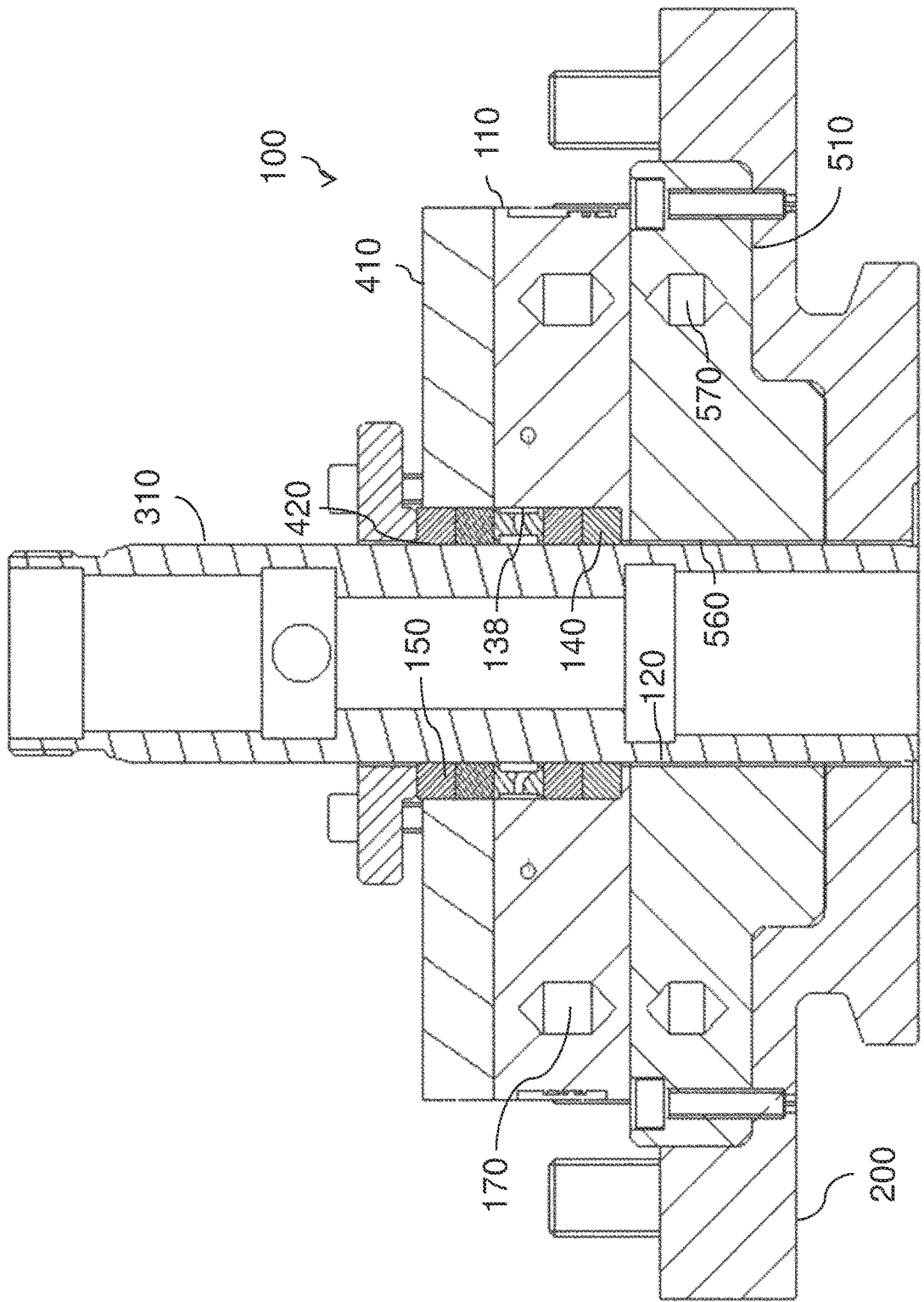

FIGS. 2A and 2B show schematically an arrangement of the sealing device 100 of FIG. 1, supplemented by further components, on a housing 200, e.g. a twin-screw extrusion device. Here, FIG. 2B shows a section through the sealing device 100 along the line A and perpendicularly to the image plane of FIG. 2A.

The sealing device 100 of FIGS. 2A and 2B is suitable for the sealing of a first shaft 310 and a second shaft 320, which drive two extruder screws of the extrusion device in the housing 200.

In addition to the first body 110, described above, with the first opening 120, the sealing device 100 has in the example of FIG. 2 a second body 410 with two second openings 420 and a third body 510, which is configured substantially like the first body 110. The first body 110 is connected here in the direction of the housing 200 on the third body 510 and in an opposite manner with the second body 410. The sealing device 100 is connected to the housing 200 via the third body 510. As shown in FIGS. 2A and 2B, the individual components can be fastened to one another by means of screw connections. However, any other fastening method is also possible, such as e.g. welding.

The first shaft 310 is directed through the first opening 120 of the first body 110 in the manner described above. The first opening 120 has a gradation in the direction of the housing 200, on which the first sealant 140 sits firmly. Following thereon, the outlets 138 of the sealing line 130 are arranged, via which the sealing medium is fed into the opening 130. The first shaft 310 then runs through a second opening 420 in the second body 410 and from there to the gearing (not shown). This second opening 420 (alternatively the first opening 120 or both openings in cooperation) holds a second sealant 150, which together with the first sealant 140 delimits a region of the first opening 120 and holds the sealing medium therein. This sequence enables a reliable sealing of material which is to be sealed, exiting from the housing 200 along the first shaft 310.

A similar sequence of sealants and line outlets is provided through the interaction of the housing 200 and of the third body 510 for the second shaft 320. The third body 510 has a first opening 520, corresponding to the first opening 120 of the first body 110, through which the second shaft 320 projects. Third sealants 540, corresponding to the first sealants 140, are set firmly at a gradation in the first opening 520 of the third body 510. These and fourth sealants 550, corresponding to the second sealants 150, surround outlets, opening in the first opening 520 of the third body 510, of a sealing line 530 formed in the third body 510. The sealing line 530 of the third body 510 can be connected here with the sealing line 130 of the third body 110, or can have its own inlet for an (also other) sealing medium. The fourth sealants 550 are held here by a recess in the housing 200 and/or the first opening 520 of the third body 510.

The second shaft 320 then runs further through the third opening 160 of the first body 110 and through a further second opening 420 in the second body 410, without being sealed again. From there, the second shaft runs to the gearing (not shown).

For the first shaft 310, a third opening 560 of the third body 510 corresponds to the third opening 160 of the first body 110, through which the first shaft 310 likewise runs, without being sealed.

The first, second, third and fourth sealants 140, 150, 540, 550 described above can all be of the same type and be formed e.g. as an O-ring, radial shaft sealing ring, press seal or stuffing box packing. The sealant 140, 150, 540, 550 can, however, also be configured differently, if this were to be necessary e.g. for reasons of manufacturing technique or for cost reasons. The combination of different seal types to a sealant is also possible.

As with the first body 110, the third body 510 can be produced in one piece by means of additive manufacture, whereas the second body 410 is preferably manufactured in a conventional manner, because it does not have a branching line system, like the first body 110 and the third body 510. The feed to the line inlet 132, shown on the gearing side in the second body 410, can be produced here by a bore. However, it is also possible to produce first and third body or else all three bodies in one piece by means of additive manufacture.

Both in the first body 110 and also in the third body 510, a cooling line 170, 570 with hexagonal cross-section is formed, which are connected to one another. The cooling lines 170, 570 in the first and in the third body 110, 510 are arranged here respectively in a different plane to the corresponding sealing lines 130, 530. Hereby, the manufacture is facilitated. In addition, the stability of the bodies 110, 510 is increased.

The cooling line inlet 172 and the cooling line outlet 174 of the cooling line 170 of the first body 110 lie in FIG. 2A on the side of the first body 110 facing the housing 200 on the left-hand side beneath the shown cross-section through the cooling line 170. The cooling medium flows along the arrow B within a supply line (not shown) from the exterior into the third body 510 and is guided from there into the cooling line inlet 172 of the cooling line 170 in the first body 110.

Within the first body 110, the line 170 runs in a ring-shaped manner around the first opening 120 and the second opening 160, as shown in FIG. 1. The cooling medium therefore exits for example on the left-hand side perpendicularly to the image plane of FIG. 2A forwards, describes a semicircle and enters through the cross-section of the cooling line 170, shown on the right-hand side of FIG. 2A, in the first body 110 again. From there, it again describes a semicircle and enters in the region of the cross-section of the cooling line 170, shown on the left, downwards into the cooling line 570 of the third body 510. Here, also, the first opening 520 and the third opening 560 will run around in a circular manner in the third body 510, until the cooling medium leaves the sealing device at the left edge of the image again.

Therefore, a single cooling circuit is sufficient in order to cool the entire sealing device in an effective and spatially homogeneous manner. In this way, systems with more than one shaft, such as e.g. multi-screw extruders can be sealed in a cooled manner.

Through the sealing device shown in FIGS. 2A and 2B, moreover, an effective sealing can be achieved for a multi-screw extrusion device by the sealing being shifted from the housing of the extrusion device into a sealing plate which is to be fastened to the housing. Preferably, this is also produced by means of 3D printing in the region of sealing lines for a sealing medium, in order to guarantee a feeding, which is uniform and therefore better able to be sealed, of the sealing medium to the shaft.

The above-mentioned components of the sealing device can all be realized by means of computer program products which are known in principle and are suitable for additive manufacture, e.g. files for 3D printing, when these are executed on a device for additive manufacture. This makes it possible to produce the sealing devices in a decentralized manner.

LIST OF REFERENCE NUMBERS

100 sealing device
110 first body
120 first opening of the first body
130 sealing line in the first body
132 inlet of the sealing line in the first body
134 diversion of the sealing line in the first body
136 divergence of the sealing line in the first body
138 outlet of the sealing line in the first body
140 first sealing means
150 second sealing means
160 third opening of the first body
170 cooling line in the first body
172 cooling line inlet
174 cooling line outlet
200 housing
310 (first) shaft
320 (second) shaft
410 second body
420 second opening
510 third body
520 first opening in the third body
530 sealing line in the third body
540 third sealant
550 fourth sealant
560 third opening in the third body
570 cooling line in the third body

What is claimed is:

1. A sealing device (100) for sealing the intermediate space between a housing (200) and a shaft (310) rotatably mounted in the housing, having:
    a first plate-shaped body (110) with a front face, a rear face and a first opening (120), which extends from the front face to the rear face and is suitable for feeding through the shaft (310);
    a cooling line (170) which runs in the body (110) and is suitable for directing a cooling medium; wherein
    the first body (110) is suitable for being tightly secured to the housing (200) such that the shaft (310), rotatably mounted in the housing (200), is guided through the first opening (120);
    the first opening (120) is configured for introducing sealants (140) such that the sealants (140) seal an intermediate space between the shaft (310) and the first body (110); and
    the cooling line (170) is guided continuously around the first opening (120) between a cooling line inlet (172) and a cooling line outlet (174) for the cooling medium such that heat produced by rotating of the shaft (310) can be dissipated by the cooling medium in a spatially homogeneous manner,
    wherein the sealants (140) are configured as a stuffing box; furthermore having
    a sealing line (130), running in the body (110), which is suitable for directing a liquid or gaseous sealing medium; wherein
    the sealing line (130) has a multiplicity of outlets (138) connected with an inlet (132) via at least one diversion (134) and/or at least one divergence (136), which lead radially into the first opening (120); and
    the sealants (140), introduced into the first opening (120), seal an intermediate space between the shaft (310) and the first body (110), without blocking the outlets (138) of the sealing line (130).

2. The sealing device (100) according to claim 1, wherein the first body (110) is formed in one piece by means of an additive manufacturing method.

3. The sealing device (100) according to claim 1, wherein the cooling line (170) has a hexagonal cross-section.

4. The sealing device (100) according to claim 1, wherein the cooling line (170) diverges into several partial lines within the first body (110).

5. The sealing device (100) according to claim 1, wherein the at least one diversion (134) and/or at least one divergence (136) lead radially symmetrically into the first opening (120).

6. The sealing device (100) according to claim 1, wherein the first body (110) has a further opening (160), which is suitable for feeding through a further shaft (320).

7. The sealing device (100) according to claim 6, having furthermore
- a further body (510), which is constructed like the first body (110) and is suitable for being tightly secured to the first body (110), such that the first opening (120) of the first body (110) overlaps with the further opening (560) of the further body (510) and permits the feeding through of the shaft (310), and that the further opening (160) of the first body (110) overlaps with the first opening (520) of the further body (510) and permits a feeding through of the further shaft (320); wherein
- the cooling line (170) of the first body (110) is connected to a (570) cooling line of the further body (510) such that both cooling lines (170, 570) are fed via a shared inlet.

8. An extrusion device, having
- an extrusion screw rotatably mounted in a housing (200) by means of a shaft (310); and
- a sealing device (100) according to claim 1 for sealing the intermediate space between the housing (200) and the shaft (310).

9. A multi-screw extrusion device, having
- two extrusion screws rotatably mounted in a housing (200) by means of a first shaft (310) and a second shaft (320); and
- a sealing device (100) according to claim 6 for sealing the intermediate space between the housing (200) and the first shaft (310) and the second shaft (320).

10. A method for the production of a sealing device according to claim 1, comprising:
- producing the first body by means of an additive production method by means of 3D printing.

11. A computer program product which on execution on a device for additive manufacture causes the device for additive manufacture to carry out the method of claim 10.

* * * * *